(12) United States Patent
Davis et al.

(10) Patent No.: US 6,172,853 B1
(45) Date of Patent: Jan. 9, 2001

(54) HEAD SUSPENSION HAVING A NEAR DIMPLE MOTION LIMITER

(75) Inventors: Michael W. Davis, Minnetonka; David A. Ziegler, Hutchinson, both of MN (US)

(73) Assignee: Hutchinson Technology Incorporated, Hutchinson, MN (US)

( * ) Notice: Under 35 U.S.C. 154(b), the term of this patent shall be extended for 0 days.

(21) Appl. No.: 09/315,678

(22) Filed: May 20, 1999

(51) Int. Cl.$^7$ ........................................... G11B 5/48
(52) U.S. Cl. ................................................. 360/245.7
(58) Field of Search ........................... 360/244.2, 244.8, 360/245, 245.1, 245.3, 245.4, 245.5, 245.7; 29/603.03, 603.04, 603.05, 603.06

(56) References Cited

U.S. PATENT DOCUMENTS

| | | | |
|---|---|---|---|
| 3,349,384 | 10/1967 | Kohn | 360/244 |
| 3,665,434 | 5/1972 | Applequist et al. | 360/245.3 |
| 4,204,235 | 5/1980 | Stollorz | 360/244.9 |
| 4,206,489 | 6/1980 | Manzke et al. | 360/255.9 |
| 4,700,250 | 10/1987 | Kuriyama | 360/234.6 |
| 4,724,500 | 2/1988 | Dalziel | 360/245.7 |
| 4,777,551 | 10/1988 | Seki et al. | 360/246.4 |
| 4,807,070 | 2/1989 | Isozaki et al. | 360/245.7 |
| 4,939,611 | 7/1990 | Connolly | 360/265.1 |
| 4,943,881 | 7/1990 | Isozaki et al. | 360/245.7 |
| 5,185,683 | 2/1993 | Oberg et al. | 360/244.6 |
| 5,329,504 | 7/1994 | Mukawa | 369/13 |
| 5,333,085 | 7/1994 | Prentice et al. | 360/245.7 |
| 5,353,181 | 10/1994 | Frater et al. | 360/245.3 |
| 5,367,419 | 11/1994 | Kazama | 360/245.7 |
| 5,428,490 | 6/1995 | Hagen | 360/245.5 |
| 5,526,205 | 6/1996 | Aoyagi et al. | 360/244.2 |
| 5,535,075 | 7/1996 | Takahashi et al. | 369/256 |
| 5,612,841 | 3/1997 | Johnson | 360/245.2 |
| 5,640,290 | 6/1997 | Khanna et al. | 360/97.01 |
| 5,682,279 | 10/1997 | Imasaki | 360/245 |
| 5,771,136 | 6/1998 | Girard | 360/245.7 |
| 5,815,349 | 9/1998 | Frater | 360/245.7 |
| 5,838,517 | 11/1998 | Frater et al. | 360/245.7 |

(List continued on next page.)

FOREIGN PATENT DOCUMENTS

| | | |
|---|---|---|
| 0 121 057 | 10/1984 | (EP) . |
| 0 617 411 A2 | 9/1994 | (EP) . |
| 56-19554 | 2/1981 | (JP) . |
| 57-105860 | 7/1982 | (JP) . |
| 62-97168 | 6/1987 | (JP) . |
| 64-62876 | 3/1989 | (JP) . |
| 9-134577 | 5/1997 | (JP) . |
| WO 97/21212 | 6/1997 | (WO) . |

*Primary Examiner*—David L. Ometz
(74) *Attorney, Agent, or Firm*—Faegre & Benson LLP

(57) ABSTRACT

A head suspension for supporting a head slider over a disk surface within a rigid disk drive includes a load beam with a flexure at a distal end of the load beam. The head suspension includes a motion limiter for restricting the range of motion of the flexure relative to the load beam. Toward this end, the motion limiter of the present invention includes a hook formed by bending a cantilever arm of the flexure to position a hook tip of the hook substantially over a load point of the suspension. The motion limiter constrains the load beam between the hook tip and the flexure in order to limit vertical displacement of the flexure relative to the load beam, as can occur through deflections caused by a shock load, through excessive pitch and roll motion of the flexure, or through operational movement of the head suspension assembly within the disk drive. The point contact of the hook tip substantially at the load point of the head suspension results in maximum gimbal freedom and minimum twist and distortion due to motion of the flexure. The motion limiter of the present invention is formed after a precursor structure of the load beam and co-planar flexure is formed, thereby eliminating the need for interleaving of the flexure with the load beam to achieve the desired hook positioning.

36 Claims, 15 Drawing Sheets

U.S. PATENT DOCUMENTS

| | | | |
|---|---|---|---|
| 5,877,920 | | 3/1999 | Resh .................................. 360/245.7 |
| 5,892,637 | * | 4/1999 | Brooks, Jr. et al. .............. 360/245.7 |
| 5,930,079 | * | 7/1999 | Vera et al. ........................ 360/245.7 |
| 5,987,733 | * | 11/1999 | Goss .................................. 360/245.7 |
| 6,046,883 | * | 4/2000 | Miller ................................ 360/245.7 |
| 6,067,209 | * | 5/2000 | Aoyagi et al. .................... 360/245.7 |

* cited by examiner

HEAD SUSPENSION HAVING A NEAR DIMPLE MOTION LIMITER

TECHNICAL FIELD

The present invention is directed generally to a head suspension for supporting a head slider relative to a rotating disk in a rigid disk drive. More particularly, the invention is directed to a head suspension having a motion limiter near the suspension load point dimple.

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk which is referred to as the "fly height."

Head suspensions for rigid disk drives include a load beam and a flexure. The load beam includes a mounting region at its proximal end for mounting the head suspension to an actuator of the disk drive, a rigid region, and a spring region between the mounting region and the rigid region for providing a spring force to counteract the aerodynamic lift force generated on the head slider during the drive operation as described above. The flexure includes a gimbal region having a slider mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

In one type of head suspension the flexure is formed as a separate piece having a load beam mounting region which is rigidly mounted to the distal end of the load beam using conventional methods such as spot welds. Head suspensions of this type typically include a load point dimple formed in either the load beam or the gimbal region of the flexure. The load point dimple transfers portions of the load generated by the spring region of the load beam to the flexure, provides clearance between the flexure and the load beam, and serves as a point about which the head slider can gimbal in pitch and roll directions to follow fluctuations in the disk surface.

As disk drives are designed having smaller disks, closer spacing, and increased storage densities, smaller and thinner head suspensions are required. These smaller and thinner head suspensions are susceptible to damage if the disk drive is subjected to a shock load or if the suspension experiences excessive pitch and roll motion. Moreover, as the use of portable personal computers increases, it is more likely that head suspensions in these portable computers will be subjected to shock loads. Thus, it is becoming increasingly important to design the head suspension so that it is less susceptible to excessive movements caused by shock loads and by pitch and roll motion, while still maintaining the necessary freedom of movement in the pitch and roll directions. In this manner, damaging contact between the head slider and the disk surface and permanent deformation of components of the head suspension can be prevented.

Mechanisms have been developed for limiting the movement of a free end of a cantilever portion of a flexure for protection against damage under shock loads. One such mechanism is disclosed in U.S. Pat. No. 4,724,500 to Dalziel. The Dalziel reference describes a limiter structure comprising a head slider having raised shoulders to which one or more elements are secured. The elements on the head slider overlap at least a portion of a top surface of the load beam to which the flexure is attached. The structure shown in Dalziel is rather complicated in that an assembly of components is required, including a modified head slider having raised shoulders and limiter elements. These structures add to the weight, height and difficulty of manufacture and assembly of the head suspension. The added structure would be particularly undesirable in the design of smaller head suspension.

Another motion limiter is disclosed in U.S. Pat. No. 5,333,085 to Prentice et al. The head suspension shown in Prentice includes a tab that extends from a free end of a cantilever portion of a flexure. The tab is fitted through an opening of the load beam to oppose the top surface of the load beam (i.e., the surface opposite the side of the load beam to which the flexure is mounted). Although the mechanism shown in the Prentice patent does not significantly change the weight or height of the overall suspension assembly, it does require special manufacturing and assembly steps. To assemble the flexure to the load beam, the tab would likely first be moved through the opening in the load beam and then the flexure would likely be longitudinally shifted relative to the load beam to its mounting position. This interleaving of the flexure and load beam prior to their attachment adds time and complexity to the manufacturing process. Moreover, the tab formation comprises multiple bends, the degree of each bend being important in the definition of the spacing between the tab and the top surface of the load beam. In the design shown in Prentice, errors in the formation of even one bend, including manufacturing tolerances, may affect the ultimate spacing of the limiter mechanism.

Another motion limiter is disclosed in U.S. Pat. No. 5,526,205 to Aoyagi et al. The Aoyagi reference discloses a head suspension having a perpendicular hook at an end of a flexure. The hook is shaped to engage a transverse appendage at the distal end of a load beam to prevent the end of the flexure from displacing vertically too great a distance from the load beam. Such a limiter mechanism, however, does not take into account the dynamic performance of the flexure, including excessive pitch and roll motions that can cause permanent deformation of head suspension components, but instead only limits vertical flexure motion caused by a shock load. In addition, because the single hook engages a transverse appendage on the load beam, the limiter mechanism may induce a roll bias when performing its limiting function.

Yet another motion limiter is disclosed in U.S. Pat. No. 5,877,920 to Resh. The Resh reference discloses a head suspension assembly including a load beam, a recording head and a gimbal. The gimbal is attached to the load beam on the back side opposite the recording head and includes a head mounting tab on which the recording head is mounted. A displacement limiter extends between the load beam and the gimbal for limiting vertical displacement of the gimbal in a direction toward the recording head relative to the load beam. The displacement limiter is disclosed as two tabs formed at the recording head end of the suspension. The tabs are outwardly extending from the load beam in a direction transverse to the longitudinal axis, or are inwardly extending tabs formed on the gimbal, either in a transverse or longitudinal direction. Although the combination of gimbal placement on the backside of the load beam with the formed tabs as motion limiters eliminates the interleaving problem of many types of limiter mechanisms, this type of motion limiter creates other manufacturing problems when forming the head mounting tab and the limiters. In addition, this type of limiting mechanism fails to address the issue of suspension pitch and roll torque during head lift and shock conditions.

In view of the shortcomings described above, a need exists for an improved flexure limiter in a head suspension. A limiter mechanism that provides for a full range of gimballing movement for a head slider mounted on a flexure while also preventing the flexure from being pulled away from the load point dimple of the head suspension is particularly desirable.

BRIEF SUMMARY OF THE INVENTION

The present invention is a head suspension for supporting a head slider over a disk surface in a rigid disk drive. The head suspension comprises a load beam and a flexure. The load beam includes a load portion at a distal end of the load beam. The flexure includes a gimbal portion that allows for pitch and roll motion of the head slider. The head suspension also includes a load point located in the load portion of the load beam at which the load from the load beam is transferred to the gimballing region of the flexure. The head suspension further includes a motion limiter comprising a hook formed by bending a cantilever arm of the flexure, such that a hook tip of the hook is positioned substantially over the load point of the suspension. The motion limiter constrains the load beam between the hook tip and the flexure in order to limit vertical displacement of the flexure relative to the load beam as can occur through deflections caused by a shock load or during starting and stopping movement of the head suspension. However, the motion limiter's constraint of the head suspension does not induce undesirable pitch and roll torque in the head slider, and does not inhibit necessary pitch and roll movement of the flexure. The hook tip can be located within less than 0.18 millimeters, and preferably within less than 0.10 millimeters, and more preferably within less than 0.08 millimeters of the load point.

The motion limiter may be formed with a single bend or with multiple bends, the bends being made after the substantially co-planar flexure is attached to the load beam forming a precursor structure. No interleaving of the flexure with the load beam is necessary with the motion limiters of the present invention because the hook is not formed to overlap the load beam until after the precursor structure is formed. The motion limiter embodiments of the present invention include hooks formed at various angles relative to a longitudinal axis of the head suspension that passes through the load point, in order to minimize the distance between where the hook tip contacts the load beam during displacement of the flexure and the load point.

The present invention is also directed to a method of forming a head suspension for supporting a head slider over a disk surface in a rigid disk drive. The method comprises the steps of providing a load beam having a load portion at a distal end of the load beam and an opening located within the load portion. A flexure is provided including a gimbal region adapted for allowing pitch and roll motion of the head slider. The gimbal region has a longitudinal cantilever arm. The flexure is attached to the load beam at the distal end of the load beam in a generally co-planar configuration to form a precursor structure with at least a portion of the cantilever arm positioned adjacent the opening in the load beam but not protruding through the opening nor overlapping the load beam. The cantilever arm is bent to form a motion limiter having a hook that lies in a plane non-parallel to a plane of the flexure and protrudes through the opening of the load beam. The hook has a hook tip positioned over the load portion of the load beam in close proximity to a load point at which a load is transferred from the load portion to the flexure, such that a portion of the load beam is constrained between the hook tip and the flexure, thereby limiting vertical displacement of the flexure relative to the load beam and yet not limiting pitch and roll motion of the head slider nor inducing undesirable pitch and roll torque in the slider.

DETAILED DESCRIPTION OF THE INVENTION

Figure 1:
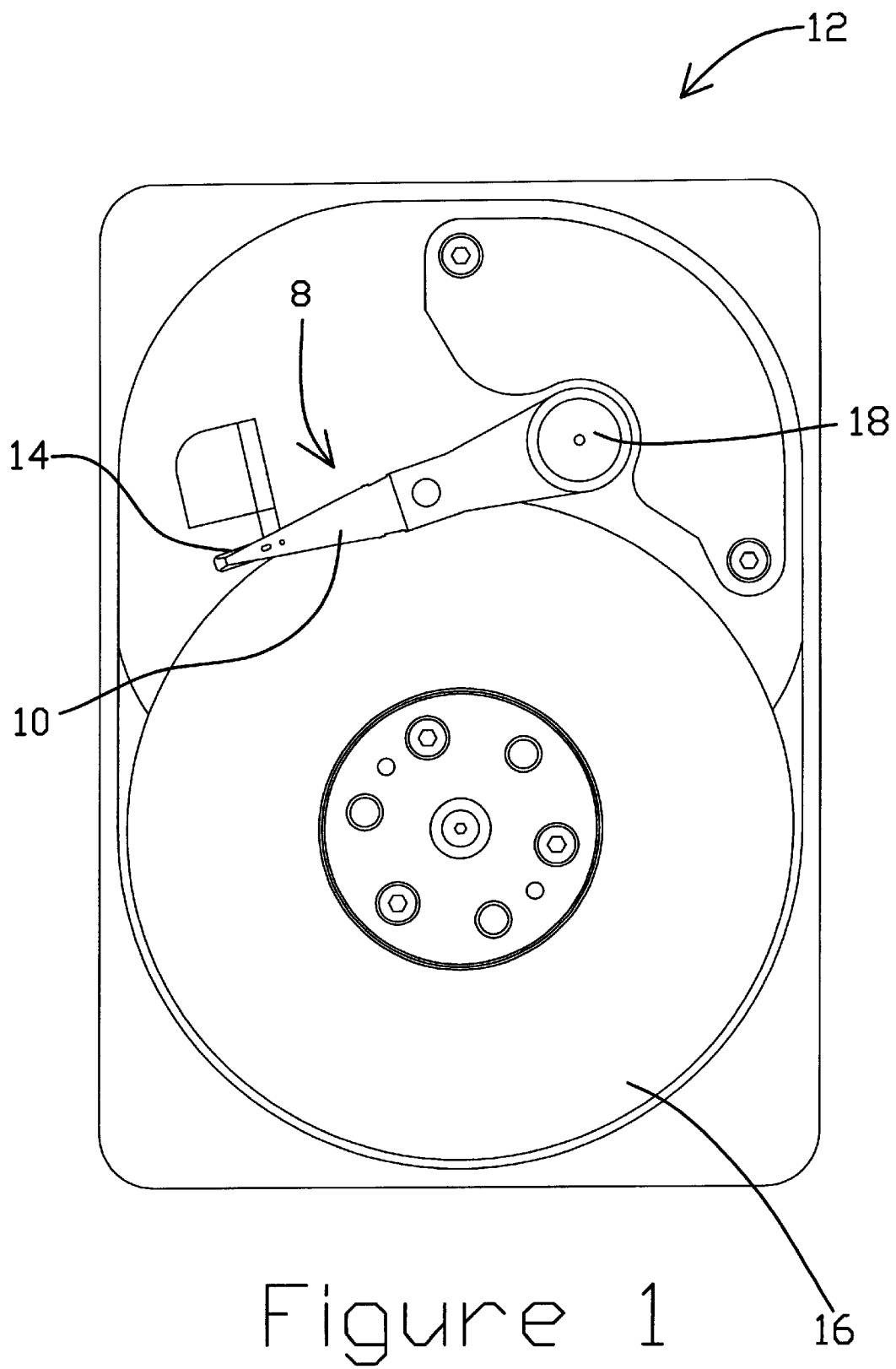
FIG. 1 is a plan view of a rigid disk drive including a head suspension in accordance with the present invention.

With reference to the attached Figures, it is to be understood that like components are labeled with like numerals throughout the several Figures. FIG. 1 illustrates a rigid disk drive 12 that includes a head suspension assembly 8. Head suspension assembly 8 resiliently supports a head slider 14 at a fly height above a rigid disk 16 during operation, as described above in the Background section. Head suspension assembly 8 is connected to a rotary actuator 18, as is known, for accessing data tracks provided on the surface of rigid disk 16. Head suspension assembly 8 could otherwise be utilized with a linear type actuator, as also well known.

Figure 2:
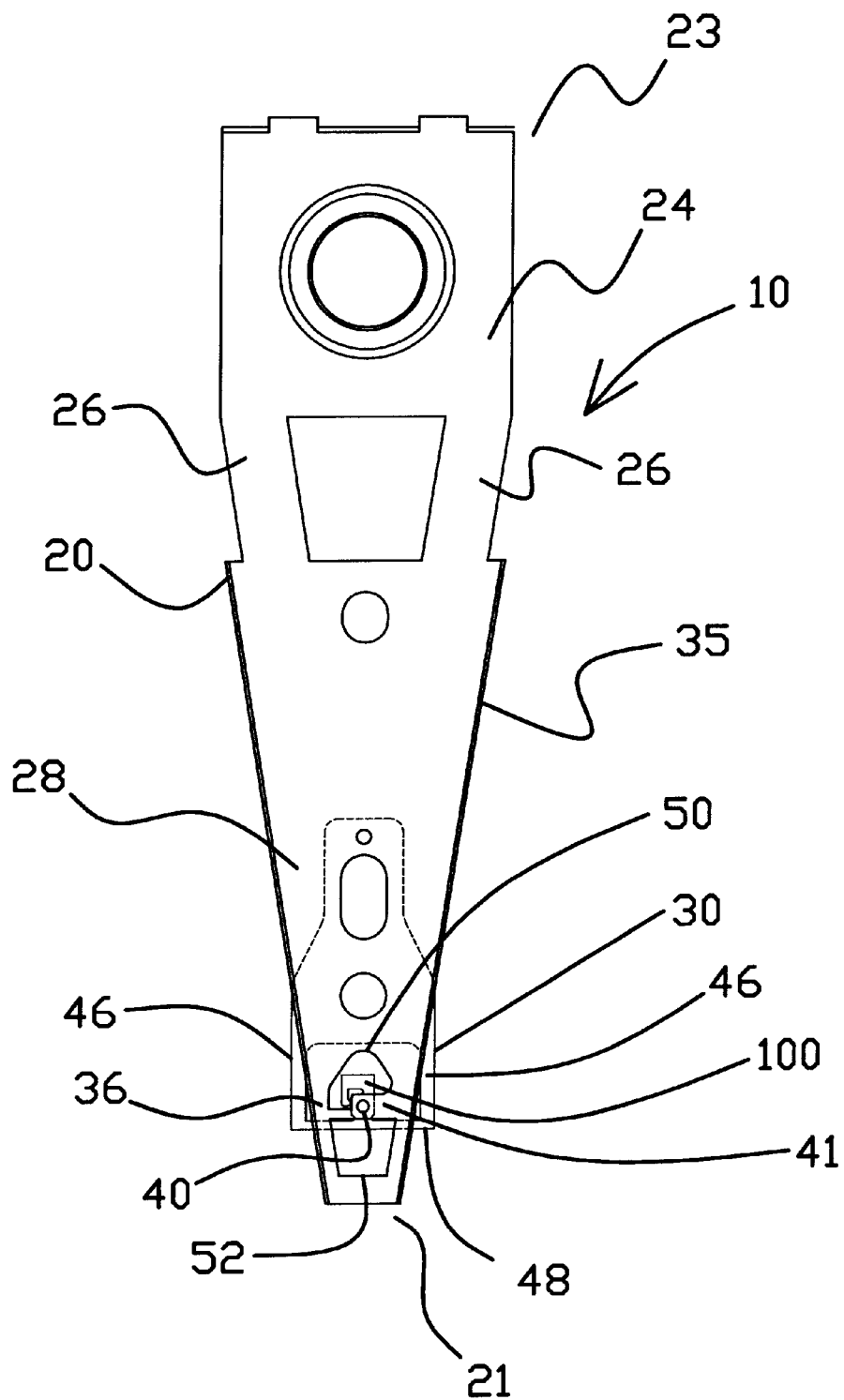
FIG. 2 is a plan view of a head suspension precursor structure.
Figure 3:
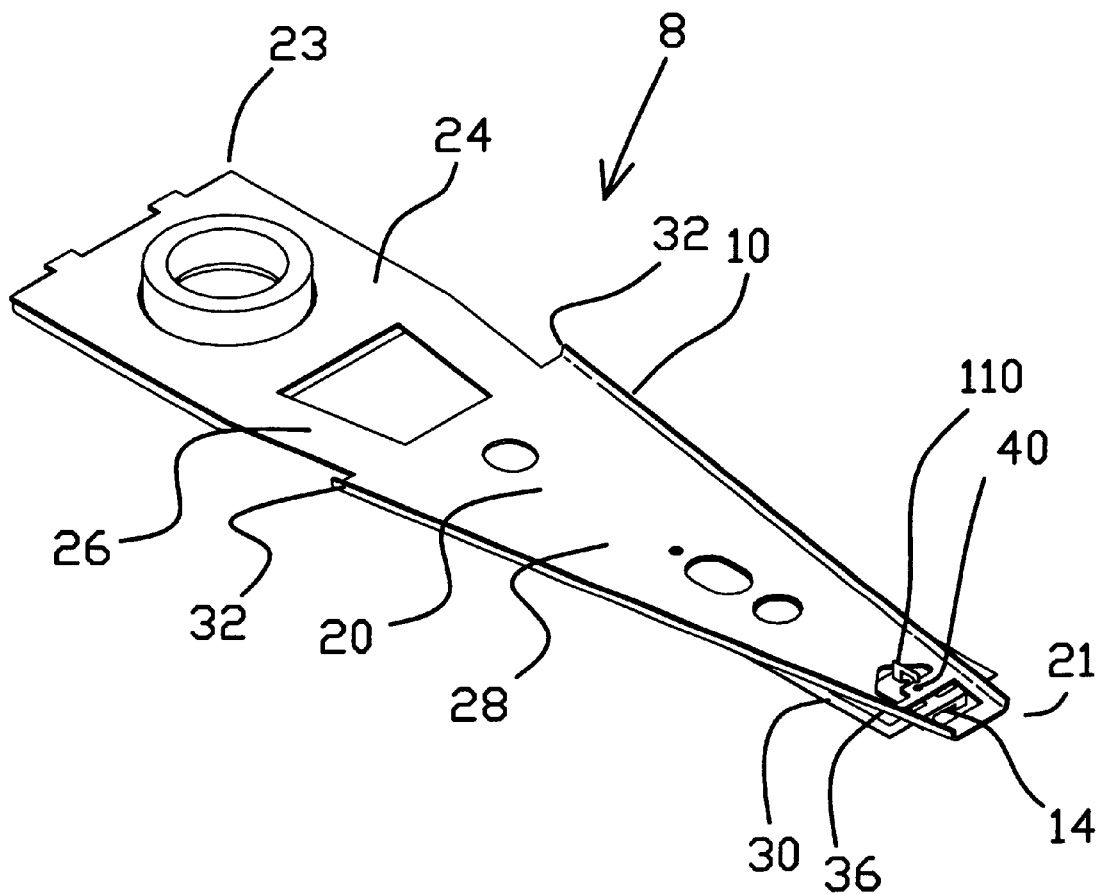
FIG. 3 is an isometric view of a head suspension assembly formed from the precursor structure of FIG. 2 having a motion limiter in accordance with the present invention showing the side opposite the head slider.
Figure 4:
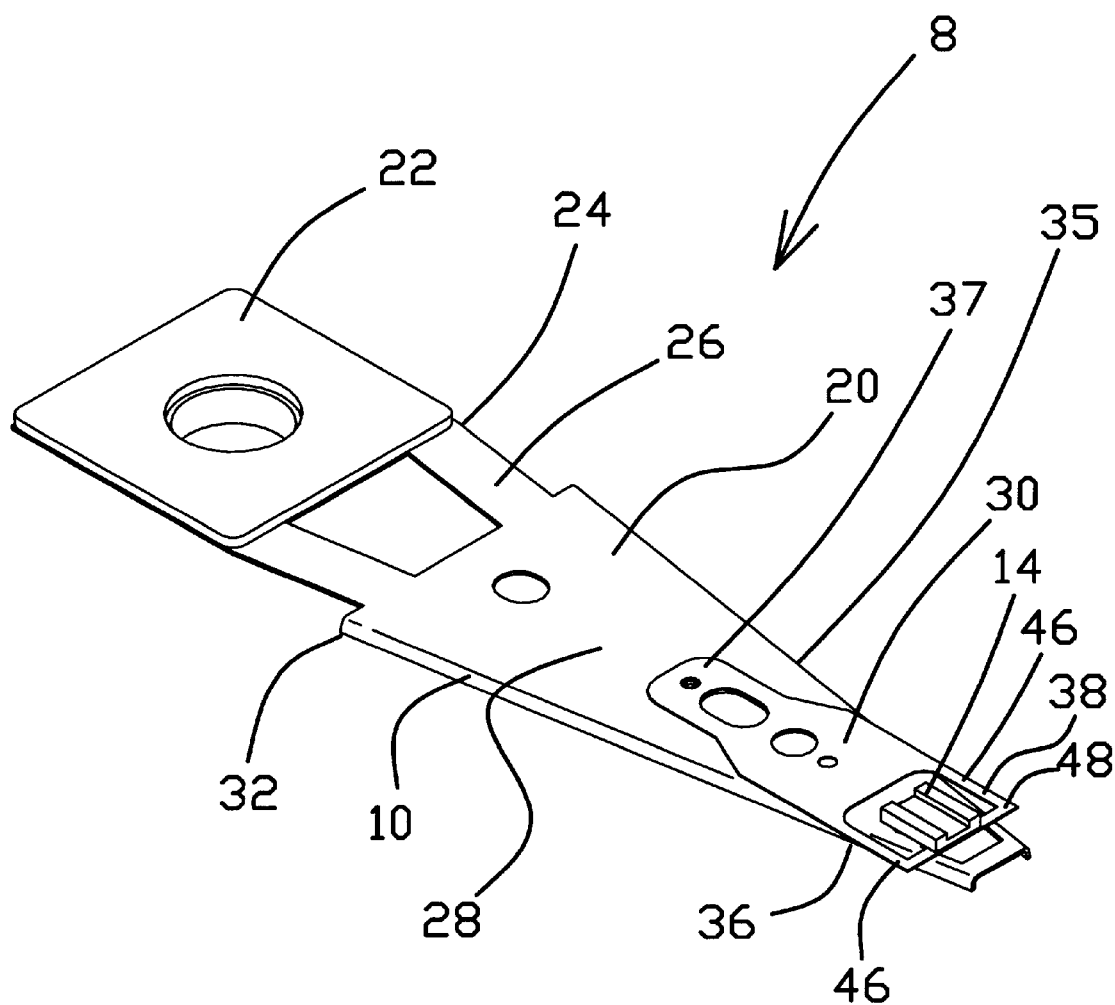
FIG. 4 is an isometric view of the head suspension assembly of FIG. 3 showing the head slider side.

FIGS. 2, 3 and 4 show head suspension assembly 8 in greater detail. Head suspension assembly 8 includes head suspension 10 in accordance with the present invention, slider 14, and a base plate 22. Head suspension 10 includes a load beam 20 and a flexure 30. Base plate 22 can be conventionally fixed to an actuator mounting region 24 located at the proximal end 23 of the load beam 20, such as by welding. The load beam 20 has a rigid region 28, and a spring region 26 between the mounting region 24 and rigid region 28. The spring region 26 typically includes a bend or radius, and provides a load to the rigid region 28 with respect to mounting region 24. Rigid region 28 is provided with stiffening rails 32, as are well known, to enhance stiffness properties.

In the embodiment shown in FIGS. 2–8, the flexure 30 extends from the distal end 21 of load beam 20, and is constructed as a separate element of head suspension 10. Flexure 30 comprises a load beam mounting region 37 and a gimbal region 38 and is generally co-planar to the load beam 20. The flexure 30 is secured to load beam 20 in a conventional manner, such as by welding load beam mounting region 37 to the rigid region 28 of the load beam 20. As shown in FIG. 2, the combination of the relatively co-planar flexure 30 attached to the load beam 20 forms a precursor structure 35.

Rigid region 28 of load beam 20 includes a load portion 36 at its distal end 21. Included in the load portion 36 is a load point 40 for transferring the load from load portion 36 to the gimbal region 38 of the flexure 30. In the embodiments shown, the load point 40 is located on a load beam cross piece 41, extending in a transverse direction relative to the load beam 20. The load point 40 may be formed extending from the load portion 36 of the load beam 20 toward gimbal region 38, or the load point 40 can be formed in gimbal region 38 to extend toward load portion 36 of load beam 20. The load point 40 may be formed as a dimple, using conventional methods such as a forming punch. Alternately, 10 the load point 40 may be formed by other structure, including an etched tower, a glass ball, or an epoxy dome.

The load portion 36 of the load beam 20 also includes an opening 50 positioned on the proximal side of the load point 40, adjacent the load beam cross piece 41. A second opening 52, also shown in the distal end 21 of the load beam 20, may be provided to aid in controlling head suspension weight and resonance. It is to be understood, however, that a second opening 52 is not required to practice the present invention. In the embodiments shown, if a second opening 52 is not provided, the load beam cross piece 41 serves as the distal end 21 of the load beam.

As perhaps best shown in FIGS. 2–6, a pair of outer arms 46 extend from the load beam mounting region 37 of flexure 30, joined by a cross-piece 48 at the ends of outer arms 46. A cantilever arm 100 extends from cross-piece 48 toward the mounting region 37, positioned between outer arms 46. Cantilever arm 100 provides a slider mounting surface to which the slider 14 (shown in FIGS. 2 and 3) is attached, such as by adhesives or the like. Cross-piece 48 can be provided with offset bends (not shown) to space cantilever arm 100 from the load portion 36 of load beam 20 by approximately the height of load point 40. Referring to FIG. 2, upon formation of the precursor structure 35, the co-planar flexure 30 is positioned with at least a portion of the cantilever arm 100 adjacent to the load portion 36 and overlapping the opening 50. However, the cantilever arm 100 does not protrude through the opening 50, nor overlap the load beam 20.

Figure 5:
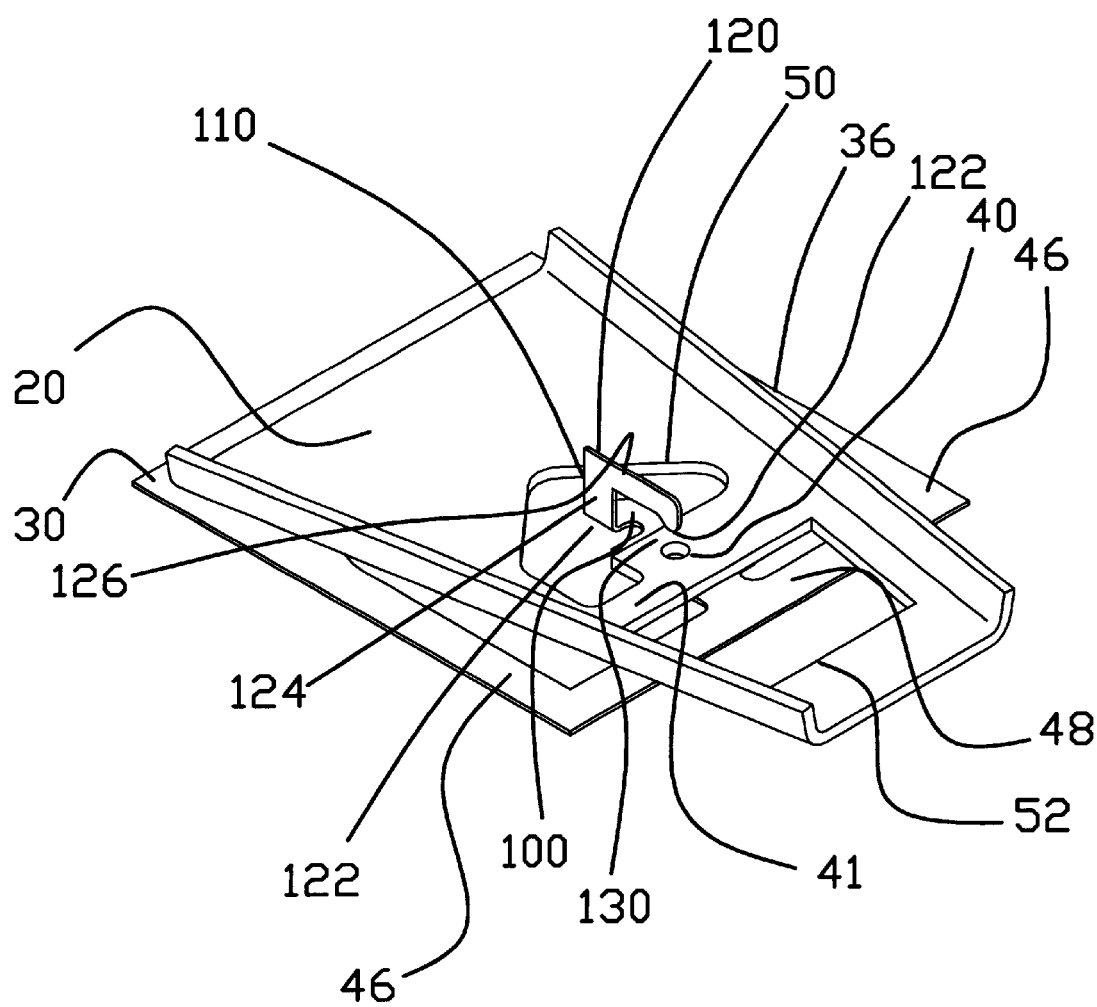
FIG. 5 is an isometric view of the distal portion of the head suspension of FIG. 3 showing the motion limiter in greater detail.
Figure 6:
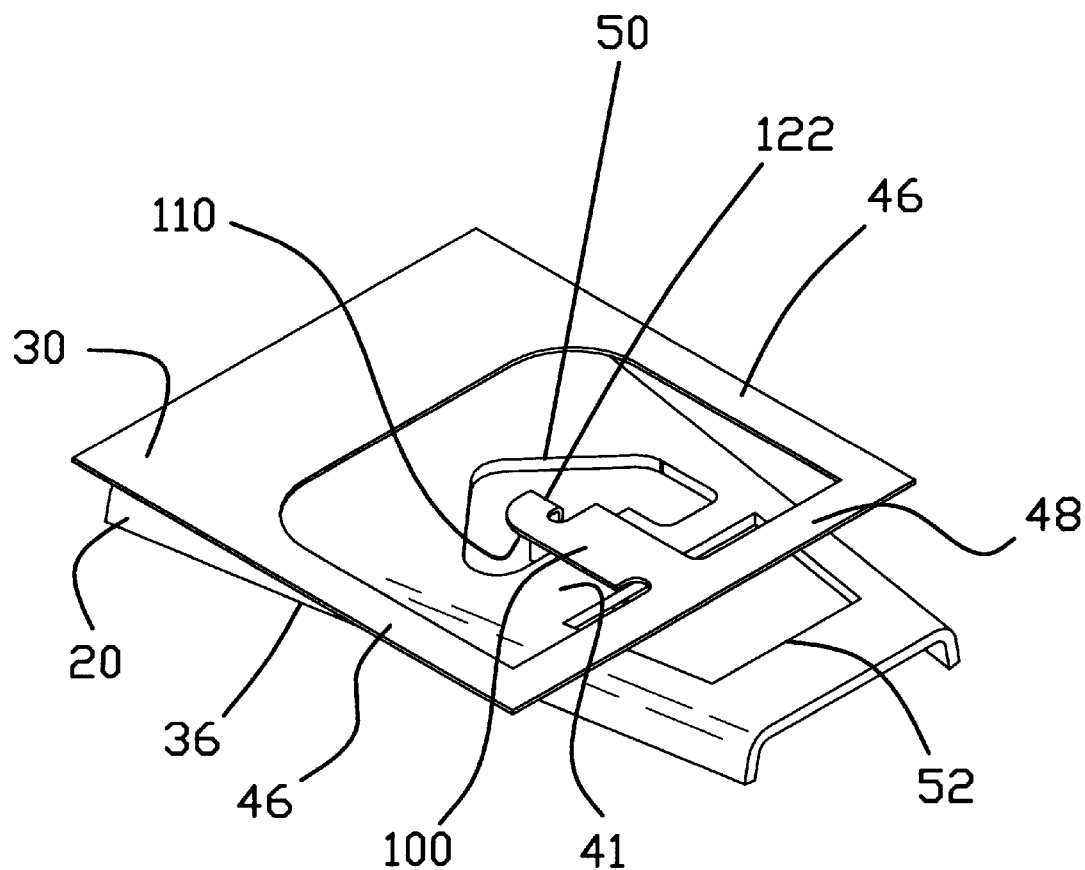
FIG. 6 is an isometric view of the portion of the head suspension shown in FIG. 5, showing the head slider side.

Referring now to FIGS. 3–8, head suspension 10 includes a motion limiter 110 that is adapted to limit movement of the flexure 30 relative to the load beam 20. In this embodiment, motion limiter 110 is constructed from the cantilever arm 100. The motion limiter 10 includes a bend 122 in the cantilever arm 100 forming a hook 120. The hook 120 includes an upstanding portion 124, a hook arm 126 formed adjacent and perpendicular to the upstanding portion 124, and a hook tip 128 formed at the end of the hook arm 126 opposite the upstanding portion 124. As best seen in FIGS. 3 and 5, after the bend 122 is made, the portion of the cantilever arm 100 overlapping the opening 50 passes through the opening 50, such that the hook 120 protrudes through the opening 50 in the load portion 36 of the load beam 20 in a direction away from the slider head 14, and thus away from the disk surface when the head suspension assembly 8 is mounted in a rigid disk drive 12. In the illustrated embodiment, the bend 122 is formed at a right angle to the plane of the flexure 30, however other angles may also be used.

Figure 7:
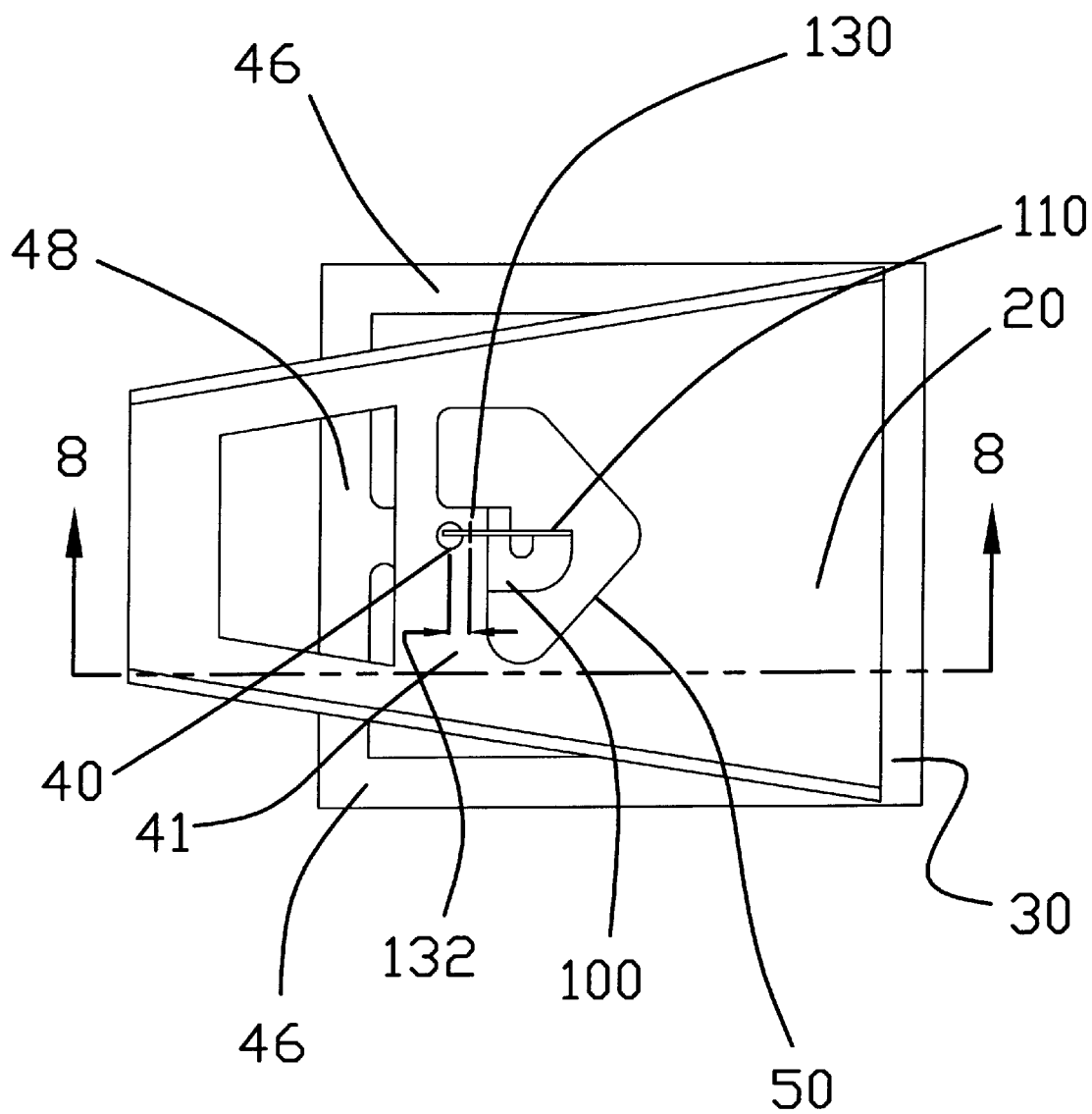
FIG. 7 is a plan view of the head suspension portion shown in FIG. 5.
Figure 8:
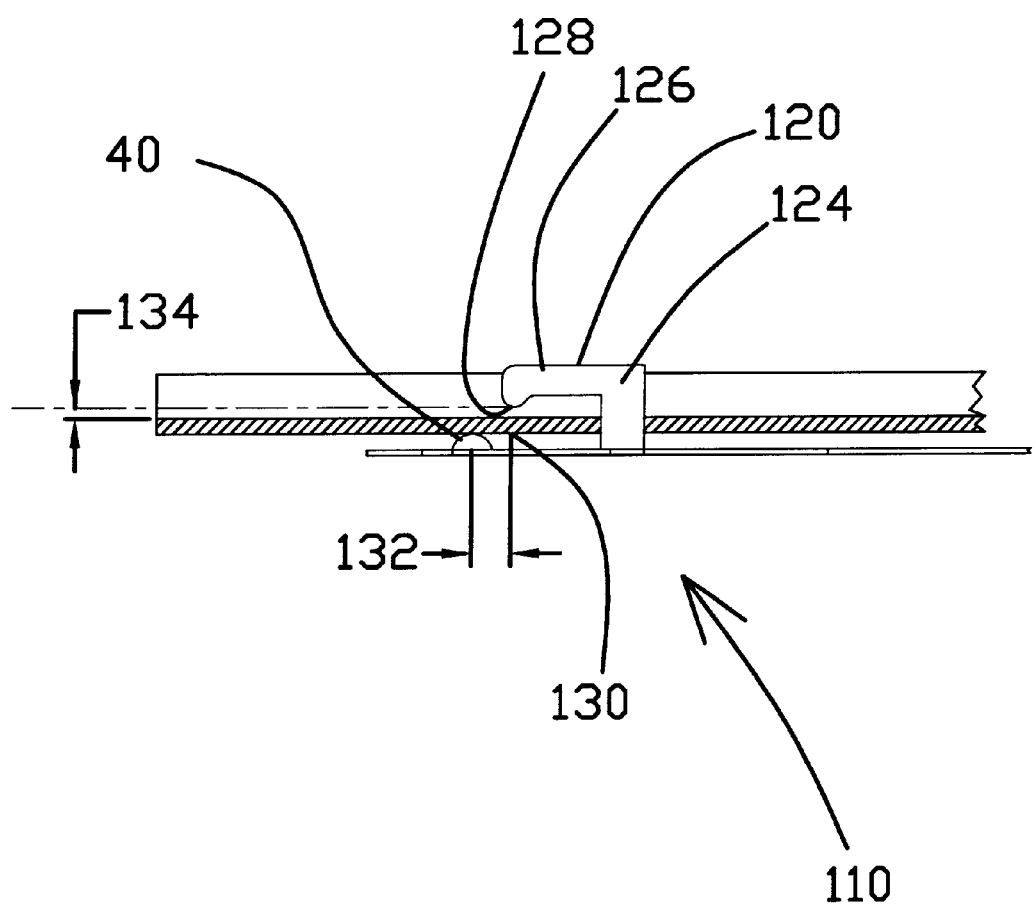
FIG. 8 is a side view of the portion of the head suspension of FIG. 7 showing the motion limiter, taken along Line 8—8.

Referring to FIGS. 7 and 8, once formed, the hook 120 is aligned along a longitudinal axis 60 of the load beam 20 that passes through the load point 40. It is to be understood, however, that the hook 120 may be aligned along a longitudinal axis of the load beam that does not pass through the load point 40, or may be aligned at an angle to a longitudinal axis. The hook tip 128 is positioned over the load portion 36 of the load beam 20 with a gap 134 between the hook tip 128 and the surface of the load beam 20. In the illustrated embodiment, the gap 134 is about 0.05 millimeters (0.002 inches) in height. In this configuration, the load beam 20 is constrained between the hook tip 128 and the flexure 30, thereby limiting the vertical displacement of the flexure 30 relative to the load beam 20. When the flexure 30 displaces vertically toward the disk 16 due to movement of the head suspension assembly 8 or due to shock loads, the hook tip 128 contacts surface of the load beam 20 at a contact point 130, thus stopping the flexure 30 from further displacement in that direction. When the flexure 30 displaces vertically away from the disk 16, the load point 40 contacts the surface of the load beam 20, thus stopping further displacement in that direction. Therefore, maximum displacement of the flexure 30 in this embodiment is about 0.05 millimeters, as determined by gap 134.

Referring now to FIG. 8, displacement of the contact point 130 from the load point 40 is a longitudinal distance 132. In an optimum configuration of the motion limiter 110, this longitudinal distance 132 approaches zero in order to provide the contact point 130 exactly over the load point 40. In the embodiment shown, the longitudinal distance 132 is less than or equal to about 0.18 millimeters (0.007 inches). In another embodiment, the longitudinal distance 132 is less than 0.10 millimeters, and more preferably within less than 0.08 millimeters of the load point 40. Contact of the hook tip 128 at the nearly zero longitudinal distance 132 provides a point contact similar to the load point 40, when the flexure displaces toward the disk. The head slider 14 may gimbal freely in pitch and roll directions in the same manner as when the flexure is constrained by the load point. As a result, when disk drive 12 is subjected to shock, when the head suspension assembly 8 is ramped onto or away from the disk 16, or when other movement of the head suspension assembly 8 occurs causing vertical displacement of the head slider 14, the motion limiter 110 does not induce twisting and deformation in the head suspension 10 due to uneven pitch and roll torque. In addition, the motion limiter 110 protects the head slider 14 from crashing into the surface of the rigid disk 16 by maintaining uniform gimballing about the hook tip 128 at contact point 130, thereby allowing the head slider 14 to continue to float evenly over and parallel to the disk 16.

Figure 9:
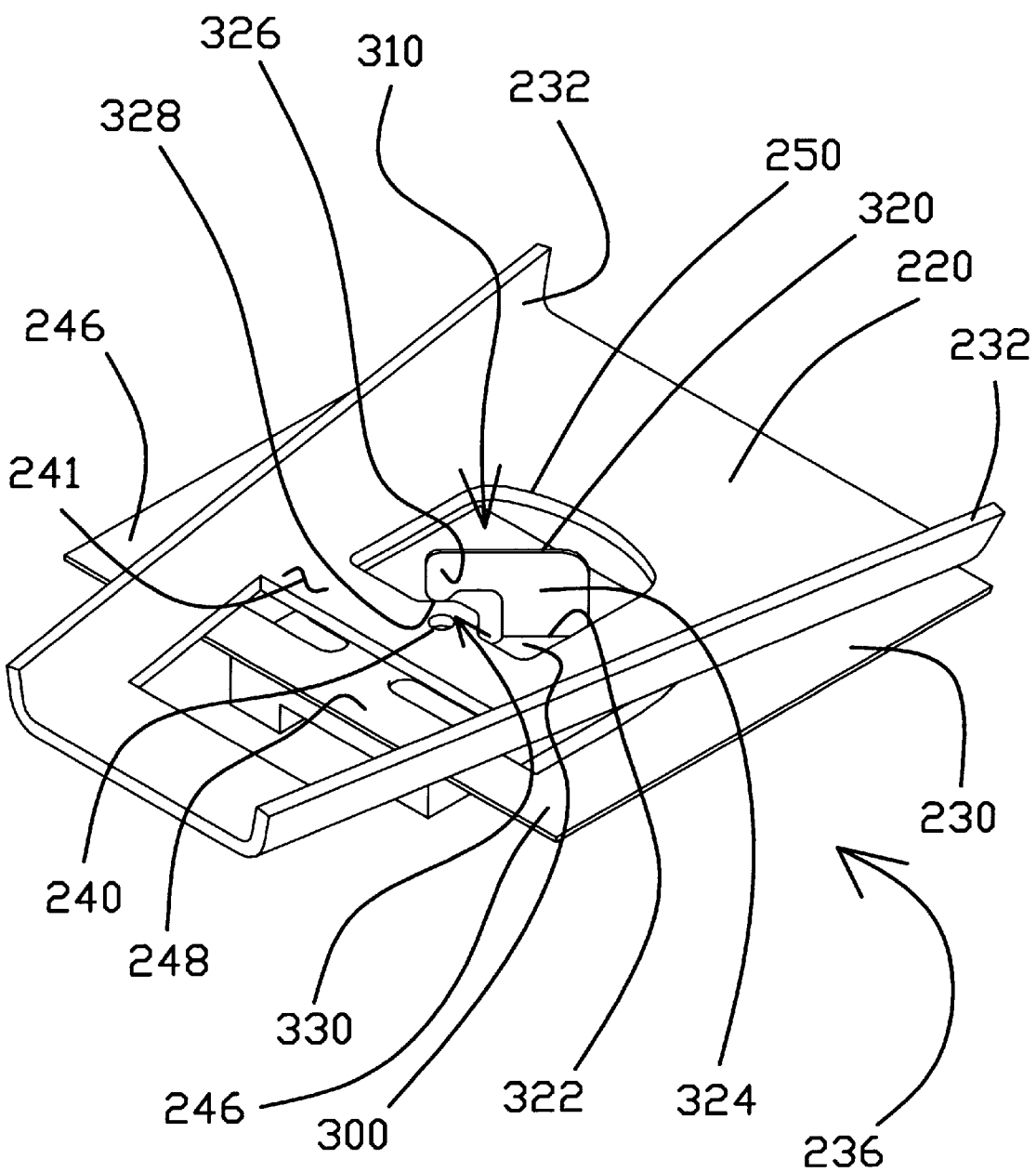
FIG. 9 is an isometric view of the distal portion of the head suspension showing another embodiment of a motion limiter in accordance with the present invention.
Figure 10:
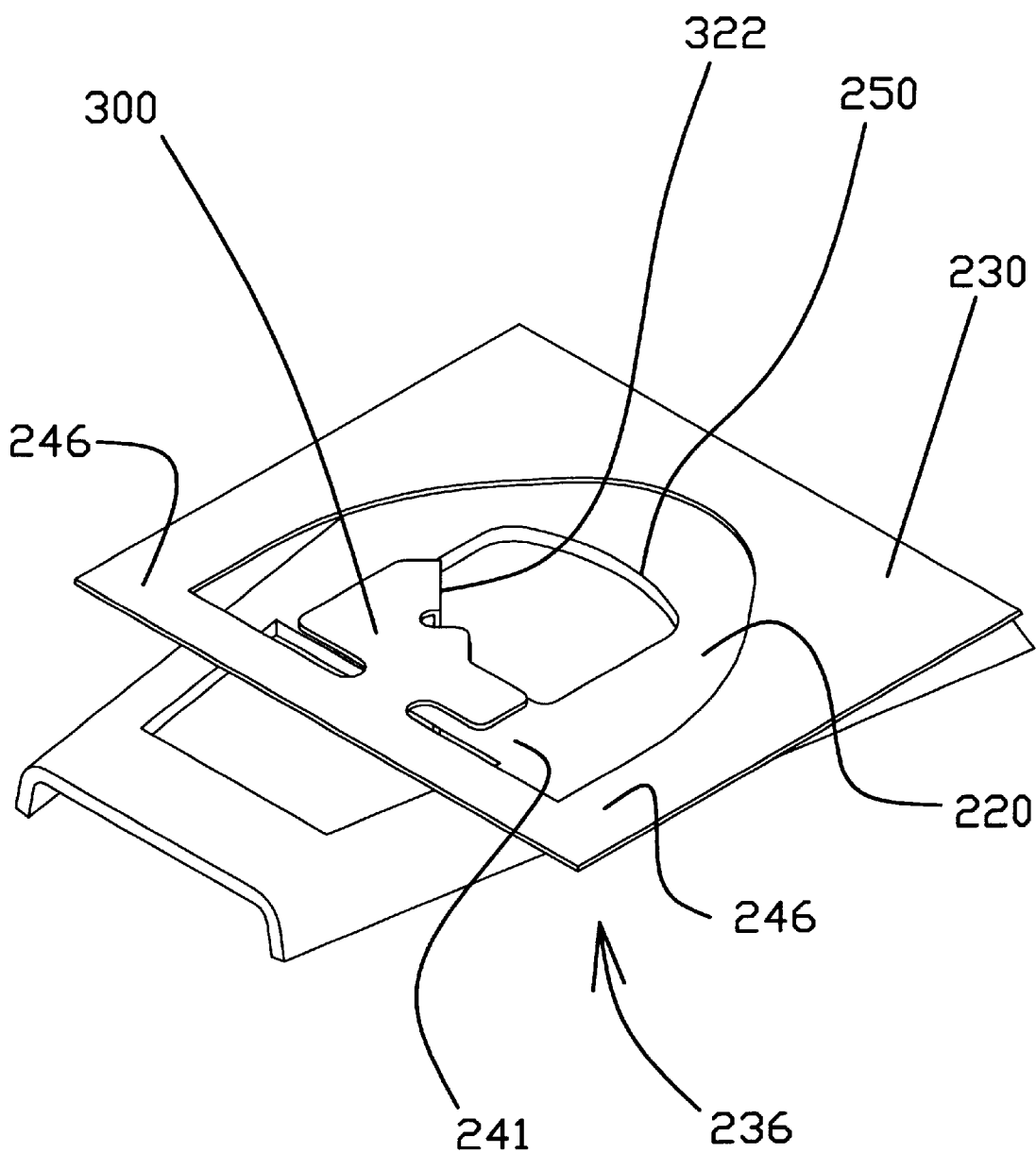
FIG. 10 is an isometric view of the head suspension portion in shown in FIG. 9, showing the head slider side.
Figure 11:
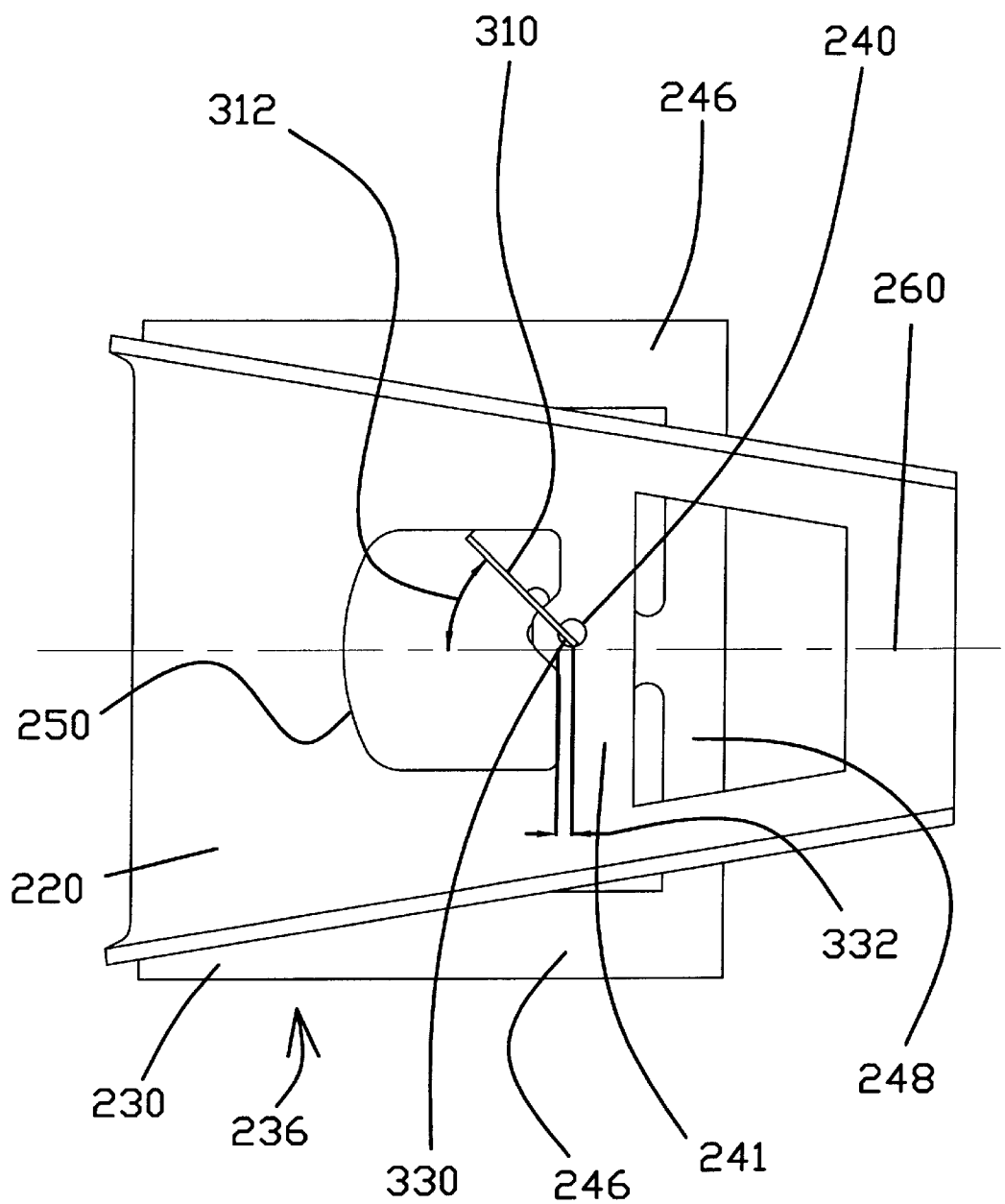
FIG. 11 is a plan view of the head suspension portion shown in FIG. 9.

Referring now to FIGS. 9–11, in an alternate embodiment of the present invention, a motion limiter 310 is constructed from a cantilever arm 300. The motion limiter 310 includes a bend 322 in the cantilever arm 300 forming a hook 320. The hook 320 includes an upstanding portion 324, a hook arm 326 formed adjacent and perpendicular to the upstanding portion 324, and a hook tip 328 formed at the end of the hook arm 326 opposite the upstanding portion 324. The hook 320 protrudes through the opening 250 in the load portion 236 of the load beam 220 in a direction away the disk surface, in the same manner as the first embodiment. In one embodiment, the bend 322 is formed at a right angle to the plane of the flexure 230, however other angles may also be used.

Once formed, the hook 320 in this embodiment is aligned at an angle 312 relative to a longitudinal axis 260 of the load beam 220. Angle 312, as shown, is about 45°, however other suitable angles are within the scope of the present invention. The hook tip 328 is positioned over the load portion 236 of the load beam 220 with a gap (not shown) similar to the gap 134 of the first embodiment, preferably about 0.05 millimeters (0.002 inches) in height. In the same manner as the first embodiment, the motion limiter 310 constrains the load beam 220 between the hook tip 328 and the flexure 230 in order to limit the vertical displacement of the flexure 230 relative to the load beam 220. When the flexure 230 displaces, the load portion 236 contacts the hook tip 328 at a contact point 330.

As shown best in FIG. 11, displacement of the contact point 330 from the load point 240 is a longitudinal distance 332. In this embodiment, the longitudinal distance 332 is less than or equal to about 0.10 millimeters (0.004 inches). With the longitudinal distance 332 closer to zero, this angled motion limiter 310 is a more optimized configuration relative to the longitudinal distance 332 than the first embodiment providing the same benefits as those described above.

Figure 12:
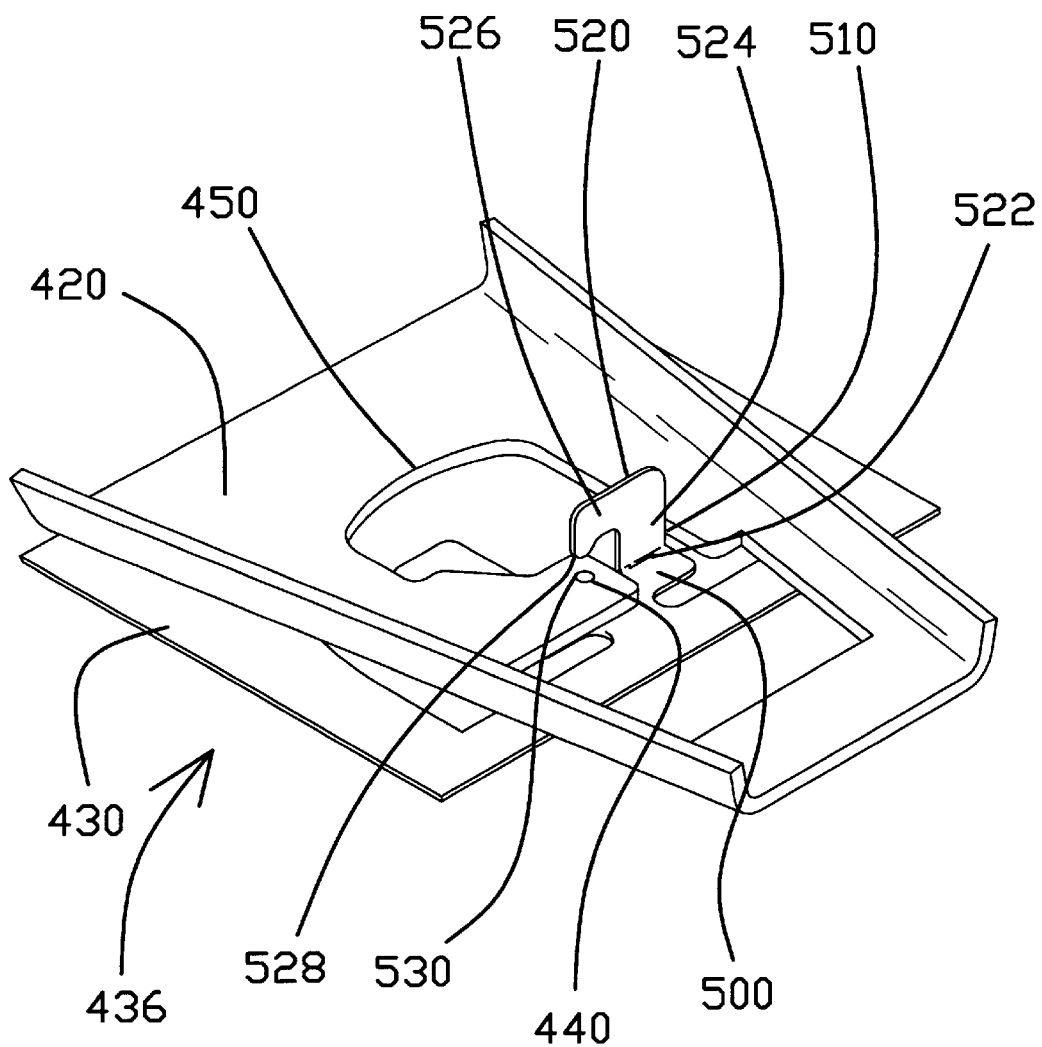
FIG. 12 is an isometric view of the distal portion of the head suspension showing another embodiment of a motion limiter in accordance with the present invention.
Figure 13:
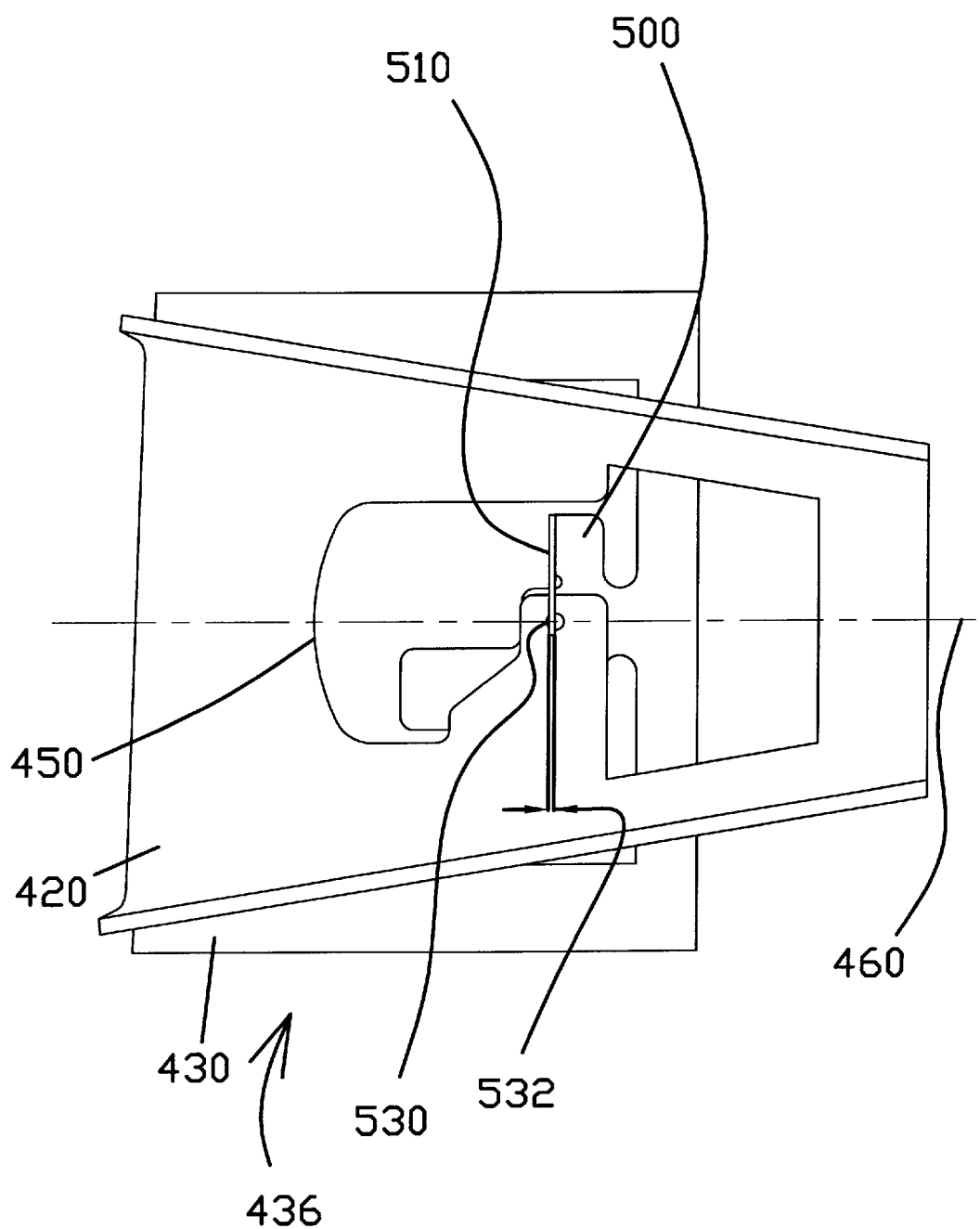
FIG. 13 is a plan view of the head suspension portion shown in FIG. 12.

Referring now to FIGS. 12 and 13, in another alternate embodiment of the present invention, a motion limiter 510 is constructed from a cantilever arm 500. The motion limiter 510 includes a bend 522 in the cantilever arm 500 forming a hook 520. The hook 520 includes an upstanding portion 524, a hook arm 526 preferably formed adjacent and perpendicular to the upstanding portion 524, and a hook tip 528 formed at the end of the hook arm 526 opposite the upstanding portion 524. The hook 520 protrudes through the opening 450 in the load portion 436 of the load beam 420 in a direction away the disk surface, in the same manner as the other two embodiments. The bend 522 is formed at a right angle to the plane of the flexure 430, however other angles may also be used.

Once formed, the hook 520 in this embodiment is aligned generally perpendicular to a longitudinal axis 460 of the load beam 420. The hook tip 528 is positioned over the load portion 436 of the load beam 420 with a gap (not shown) similar to the gap 134 of the first embodiment, about 0.05 millimeters (0.002 inches) in height. In the same manner as the other embodiments, the motion limiter 510 constrains the load beam 420 between the hook tip 528 and the flexure 430 in order to limit the vertical displacement of the flexure 430 relative to the load beam 420. When the flexure 430 displaces, the load portion 436 contacts the hook tip 528 at a contact point 530.

As shown best in FIG. 13, displacement of the contact point 530 from the load point 440 is a longitudinal distance 532. In this embodiment, the longitudinal distance 532 is less than or equal to about 0.08 millimeters (0.003 inches). With the longitudinal distance 532 even closer to zero, this angled motion limiter 510 is a more optimized configuration relative to the longitudinal distance 532 than the other embodiments, providing the same benefits as those described above.

Figure 14:
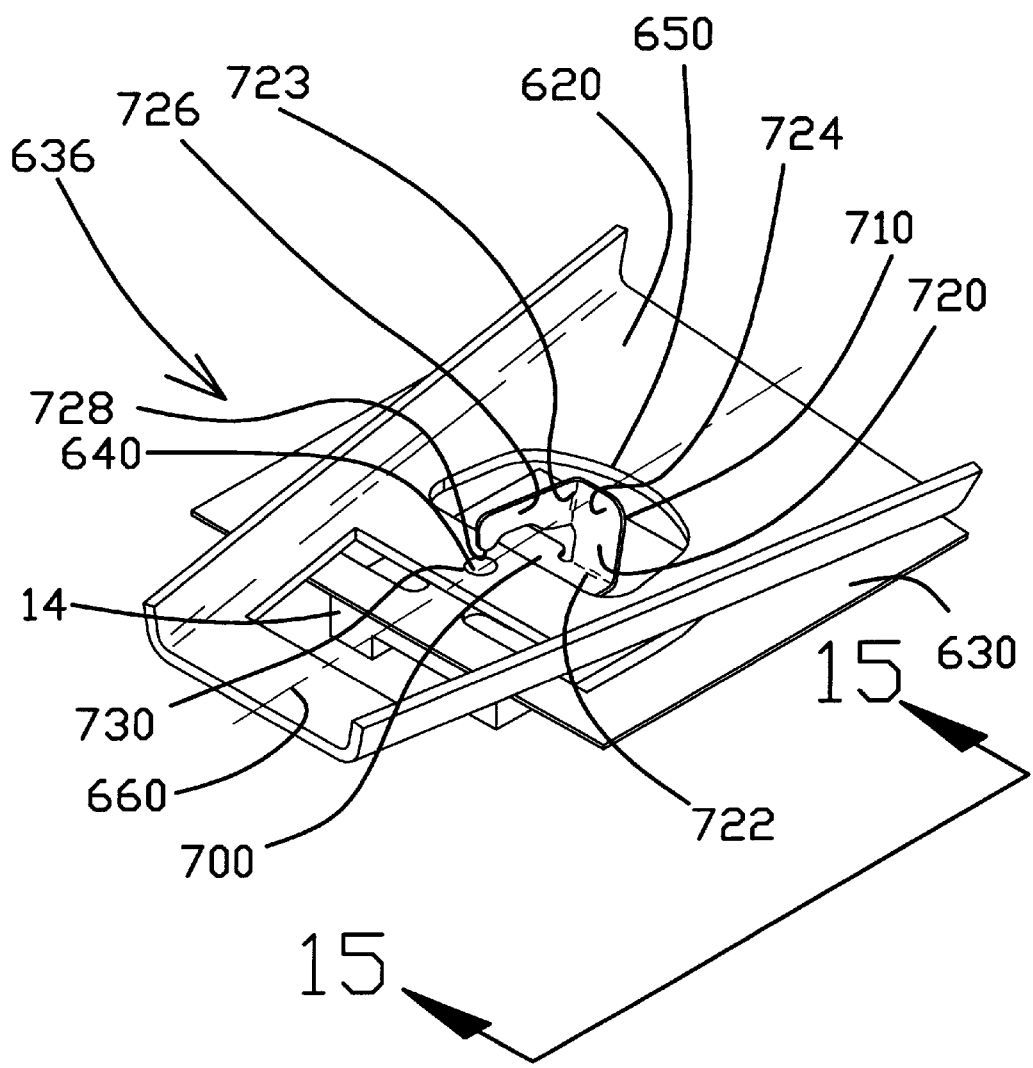
FIG. 14 is an isometric view of the distal portion of the head suspension showing another embodiment of a motion limiter in accordance with the present invention.
Figure 15:
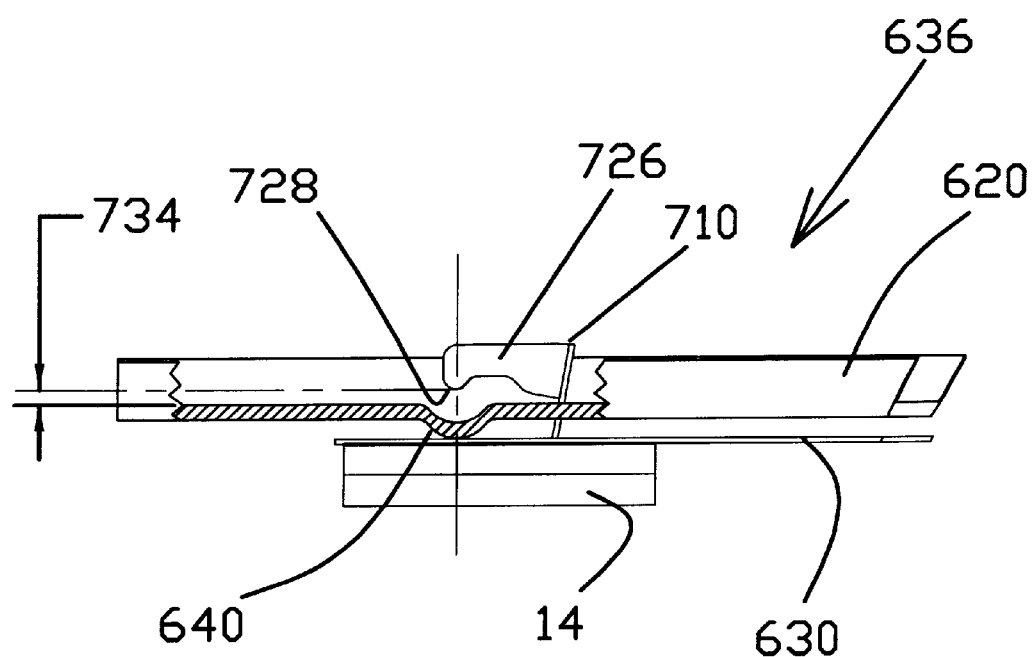
FIG. 15 is a side view of the head suspension portion shown in FIG. 14.

Referring now to FIGS. 14 and 15, in yet another embodiment of the present invention, a motion limiter 710 is constructed from a cantilever arm 700. The motion limiter 710 includes a first bend 722, as well as a second bend 723 in the cantilever arm 700 to form a hook 720. The hook 720 includes an upstanding portion 724, a hook arm 726 formed adjacent and perpendicular to the upstanding portion 724, and a hook tip 728 formed at the end of the hook arm 726 opposite the upstanding portion 724. The hook 720 protrudes through the opening in the load portion 636 of the load beam 620 in a direction away the disk surface, in the same manner as the other embodiments. The first bend 722 is formed close to a right angle to the plane of the flexure 630, and second bend 723 is formed close to a right angle to the plane of the upstanding portion 724. The angles of these two bends 722, 723 may be altered, however, in order to optimize the position of the hook tip 728 over the load point 640.

Once formed, the hook 720 in this embodiment is aligned generally parallel to a longitudinal axis 660 of the load beam 620. The hook tip 728 is positioned over the load portion 636 of the load beam 620 with a gap 734 (similar to the gap 134 of the first embodiment) of about 0.05 millimeters (0.002 inches) in height. In the same manner as the other embodiments, the motion limiter 710 constrains the load beam 620 between the hook tip 728 and the flexure 630 in order to limit the vertical displacement of the flexure 630 relative to the load beam 620. When the flexure 630 displaces, the load portion 636 contacts the hook tip 728 at a contact point 730.

As shown best in FIG. 15, displacement of the contact point 730 from the load point 640 is about zero. With the hook tip 728 positioned to contact the load portion 636 at the load point 640, this double bend motion limiter 710 is an even more optimized configuration relative to a longitudinal distance between the contact point 730 and the load point 640 than the other embodiments providing the same benefits as those described above.

The motion limiter embodiments of the present invention described above include a few single bend embodiments and one double bend embodiment. As would be evident to one skilled in the art, variations in both single and multiple bend motion limiters are both possible and desirable to provide a hook tip positioned over the load point, thus providing the benefits and advantages of the present invention. It is to be understood that such variations are contemplated and within the scope of the present invention.

Referring again to FIGS. 2–4, the head suspension 10 is formed by attaching flexure 30 to load beam 20 in a generally co-planar fashion. These two components 20, 30 may be quickly positioned adjacent one another and then conventionally attached to form the precursor structure 35. Once the precursor structure 35 is formed, the motion limiter 110 of the present invention (as described in any of the embodiments above) is formed by a bending process, wherein the bend 122 is formed in the cantilever arm 100, resulting in hook 120 protruding through the opening 50 and correctly positioned to constrain load beam 20 between the hook tip 128 and the flexure 30. One of the advantages of the present invention over other types of motion limiters is that no interleaving of the load beam 20 and the flexure 30 is necessary in order to achieve the desired positioning of the hook 120. The manufacturing process is thus faster and more efficient than interleaving processes, thereby making the head suspensions of the present invention more cost effective, as well. At the same time, the motion limiters 110 of the present invention are capable of achieving an optimized formation, wherein the hook tip 128 is positioned substantially over the load point 40 of the head suspension 10, thereby providing the maximum benefit of gimballing and minimum effect of induced pitch and roll torque on the suspension assembly 8. As is evident to one skilled in the art, the single bend embodiments are more cost effective to produce due to their need for only one bending step. Although the double bend embodiment described provides a more optimum hook tip position, the need for the additional bending process step makes this and other multiple bend configurations less desirable for overall manufacturing purposes.

Although the present invention has been described with reference to preferred embodiments, those skilled in the art will recognize that changes may be made in form and detail without departing from the spirit and scope of the invention.

What is claimed is:

1. A head suspension for supporting a head slider over a disk surface in a rigid disk drive, the head suspension being formed from a precursor structure including a load beam and a flexure, the load beam having a load portion at a distal end and an opening located within the load portion, the flexure being attached in a generally co-planar configuration to the load beam at the distal end, the flexure comprising a gimbal region adapted for pitch and roll motion, the gimbal region having a cantilever arm at least a portion of which is positioned adjacent to the opening in the load portion but not protruding through the opening nor overlapping the load beam when the flexure is attached to the load beam in the precursor structure, the head suspension comprising:

a limiter comprising at least one bend in the cantilever arm forming a hook that lies in a plane that is not parallel to a plane of the flexure and protrudes through the opening of the load portion, the hook having a hook tip positioned over the load portion of the load beam in close proximity to a load point at which a load is transferred from the load portion to the flexure such that a portion of the load beam is constrained between the hook tip and the flexure to limit vertical displacement of the flexure relative to the load beam.

2. The head suspension of claim 1, wherein the hook protrudes through the opening in the load portion in a direction generally away from the disk surface when the head suspension is mounted in the rigid disk drive.

3. The head suspension of claim 1, wherein the hook is generally parallel to a longitudinal axis of the load beam passing through the load point.

4. The head suspension of claim 3, wherein the hook is aligned with the longitudinal axis passing through the load point.

5. The head suspension of claim 1, wherein the hook is at an angle of about 45° relative to a longitudinal axis of the load beam.

6. The head suspension of claim 1, wherein the hook is generally perpendicular to a longitudinal axis of the load beam.

7. The head suspension of claim 1, wherein the limiter comprises a bend in the cantilever arm forming a hook that lies in a plane perpendicular to the flexure and protrudes through the opening in the load beam.

8. The head suspension of claim 1, wherein the limiter comprises multiple bends in the cantilever arm such that the hook lies in a plane perpendicular to the flexure and protrudes through the opening in the load beam.

9. The head suspension of claim 1, wherein a longitudinal distance between the hook tip and the load point is less than or equal to about 0.18 millimeters (0.007 inches).

10. The head suspension of claim 1, wherein a longitudinal distance between the hook tip and the load point is less than or equal to about 0.10 millimeters (0.004 inches).

11. The head suspension of claim 1, wherein a longitudinal distance between the hook tip and the load point is less than and equal to about 0.08 millimeters (0.003 inches).

12. In a head suspension for supporting a head slider over a disk surface in a rigid disk drive, the head suspension being formed from a precursor structure including a load beam and a flexure, the load beam having a load portion at a distal end and an opening located within the load portion, the flexure being attached in a generally co-planar configuration to the load beam at the distal end, the flexure comprising a gimbal region adapted for pitch and roll motion, the gimbal region having a cantilever arm at least a portion of which is positioned adjacent to the opening in the load beam but not protruding through the opening nor overlapping the load beam when the flexure is attached to the load beam in the precursor structure, a motion limiter comprising:

at least one bend in the cantilever arm forming a hook that lies in a plane that is not parallel to a plane of the flexure and protrudes through the opening of the load beam, the hook having a hook tip positioned over the load portion of the load beam in close proximity to a load point at which a load is transferred from the load portion to the flexure, such that a portion of the load beam is constrained between the hook tip and the flexure to limit vertical displacement of the flexure relative to the load beam.

13. The motion limiter of claim 12, wherein the hook protrudes through the opening in the load portion in a direction generally away from the disk surface when the head suspension is mounted in the rigid disk drive.

14. The motion limiter of claim 12, wherein the hook is generally parallel to a longitudinal axis of the load beam passing through the load point.

15. The motion limiter of claim 14, wherein the hook is aligned with the longitudinal axis passing through the load point.

16. The motion limiter of claim 12, wherein the hook is at an angle of about 45° relative to a longitudinal axis of the load beam.

17. The motion limiter of claim 12, wherein the hook is generally perpendicular to a longitudinal axis of the load beam.

18. The motion limiter of claim 12, wherein the hook lies in a plane perpendicular to the flexure and protrudes through the opening in the load beam.

19. The motion limiter of claim 12, wherein the limiter comprises multiple bends in the cantilever arm such that the hook lies in a plane perpendicular to the flexure and protrudes through the opening in the load beam.

20. The motion limiter of claim 12, wherein a longitudinal distance between the hook tip and the load point is less than or equal to about 0.18 millimeters (0.007 inches).

21. The motion limiter of claim 12, wherein a longitudinal distance between the hook tip and the load point is less than or equal to about 0.10 millimeters (0.004 inches).

22. The motion limiter of claim 12, wherein a longitudinal distance between the hook tip and the load point is less than or equal to about 0.08 millimeters (0.003 inches).

23. A method of forming a head suspension for supporting a head slider over a disk surface in a rigid disk drive, the method comprising the steps of:
   providing a load beam having a load portion at a distal end of the load beam and an opening located within the load portion;
   providing a flexure including a gimbal region adapted for pitch and roll motion about transverse and longitudinal axes of the head suspension, the gimbal region having a cantilever arm;
   attaching the flexure to the load beam at the distal end of the load beam in a generally co-planar configuration to form a precursor structure with at least a portion of the cantilever arm positioned adjacent the opening in the load beam but not protruding through the opening nor overlapping the load beam; and
   bending the cantilever arm to form a motion limiter having a hook that lies in a plane non-parallel to a plane of the flexure and protrudes through the opening of the load beam, the hook having a hook tip positioned over the load portion of the load beam in close proximity to a load point at which a load is transferred from the load portion to the flexure, such that a portion of the load beam is constrained between the hook tip and the flexure, thereby limiting vertical displacement of the flexure relative to the load beam.

24. The method of claim 23, wherein the step of bending the cantilever arm comprises the step of bending the hook parallel to a longitudinal axis of the load beam passing through the load point.

25. The method of claim 23, wherein the step of bending the cantilever arm comprises the step of bending the hook at an angle of about 45 to a longitudinal axis of the load beam.

26. The method of claim 23, wherein the step of bending the cantilever arm comprises the step of bending the hook perpendicular to a longitudinal axis of the load beam.

27. The method of claim 23, wherein the step of bending the cantilever arm comprises the step of bending the hook multiple times.

28. The method of claim 23, wherein the step of bending the cantilever arm comprises the step of positioning the hook tip at a longitudinal distance from the load point less than or equal to about 0.18 millimeters (0.007 inches).

29. The method of claim 23, wherein the step of bending the cantilever arm comprises the step of positioning the hook tip at a longitudinal distance from the load point less than or equal to about 0.10 millimeters (0.004 inches).

30. The method of claim 23, wherein the step of bending the cantilever arm comprises the step of positioning the hook tip at a longitudinal distance from the load point less than or equal to about 0.08 millimeters (0.003 inches).

31. A head suspension for supporting a head slider over a disk surface in a rigid disk drive, the head suspension being formed from a precursor structure including a load beam and a flexure, the load beam having a load portion at a distal end and an opening located within the load portion, the flexure being attached in a generally co-planar configuration to the load beam at the distal end, the flexure comprising a gimbal region adapted for pitch and roll motion about transverse and longitudinal axes of the head suspension, the gimbal region having a cantilever arm, the cantilever arm lying in a plane parallel to a plane defined by the opening in the load portion with at least a portion of the cantilever arm overlapping the opening in the load portion when the flexure is attached to the load beam in the precursor structure, the head suspension comprising:
   a limiter comprising at least one bend in the cantilever arm forming a hook that lies in a plane that is not parallel to the plane defined by the opening in the load portion and protrudes through the opening of the load portion, the hook having a hook tip positioned over the load portion of the load beam in close proximity to a load point at which a load is transferred from the load portion to the flexure such that a portion of the load beam is constrained between the hook tip and the flexure to limit vertical displacement of the flexure relative to the load beam.

32. A head suspension for supporting a head slider over a disk surface in a rigid disk drive, the head suspension being formed from a precursor structure including a load beam and a flexure, the load beam having a load portion at a distal end including a first load point at which a load is transferred from the load portion to the flexure, the first load point forming a first gimballing location about which the head slider is free to gimbal, and an opening located within the load portion, the flexure being attached in a generally co-planar configuration to the load beam at the distal end, the flexure comprising a gimbal region adapted for pitch and roll motion of the head slider about the first load point, the gimbal region having a cantilever arm with the cantilever arm lying in a plane parallel to a plane defined by the opening in the load portion with at least a portion of the cantilever arm overlapping the opening in the load portion when the flexure is attached to the load beam in the precursor structure, the head suspension comprising:
   a second load point comprising at least one bend in the cantilever arm forming a hook that lies in a plane that is not parallel to the plane defined by the opening in the load portion and protrudes through the opening of the load portion, the hook having a hook tip positioned over the load portion of the load beam in close proximity to the first load point such that a portion of the load beam is constrained between the hook tip and the flexure to limit vertical displacement of the flexure relative to the load beam, the hook tip forming a second gimballing location about which the head slider is free to gimbal when the flexure displaces relative to the load beam.

33. The head suspension of claim 32, wherein the first load point and the second load point are opposed.

34. The motion limiter of claim 32, wherein a longitudinal distance between the second load point and the first load point is less than or equal to about 0.18 millimeters (0.007 inches).

35. The motion limiter of claim 32, wherein a longitudinal distance between the second load point and the first load point is less than or equal to about 0.10 millimeters (0.004 inches).

36. The motion limiter of claim 32, wherein a longitudinal distance between the second load point and the first load point is less than or equal to about 0.08 millimeters (0.003 inches).

* * * * *